United States Patent Office 3,434,052
Patented Mar. 18, 1969

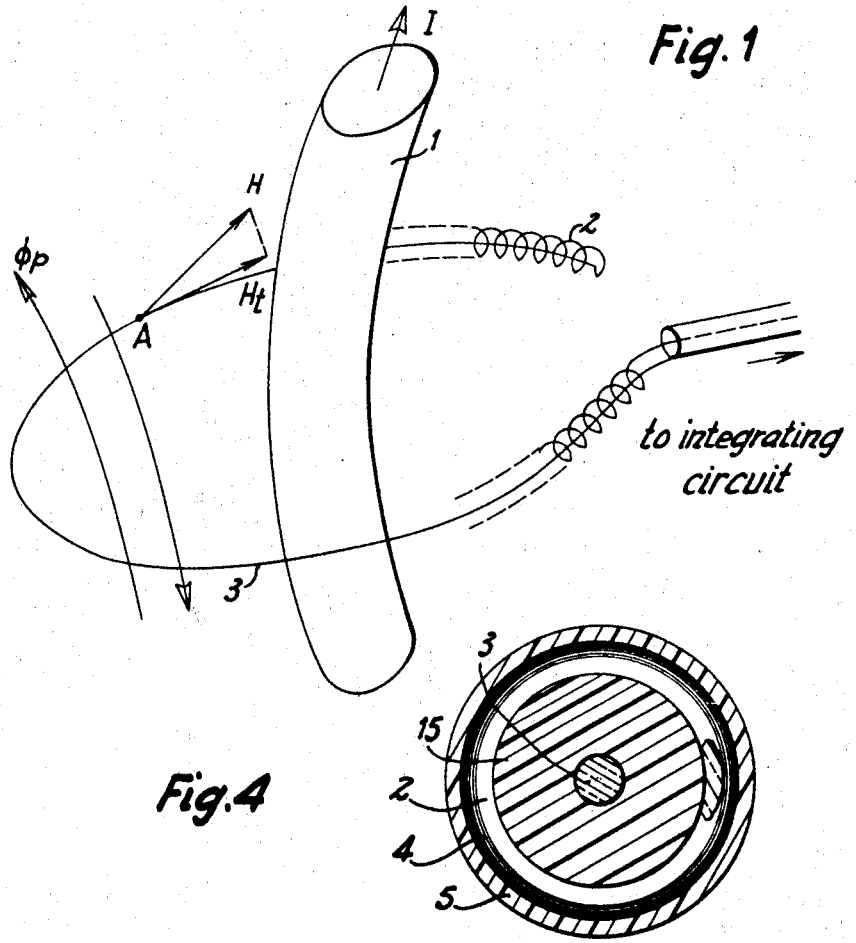
Fig. 1
Fig. 4
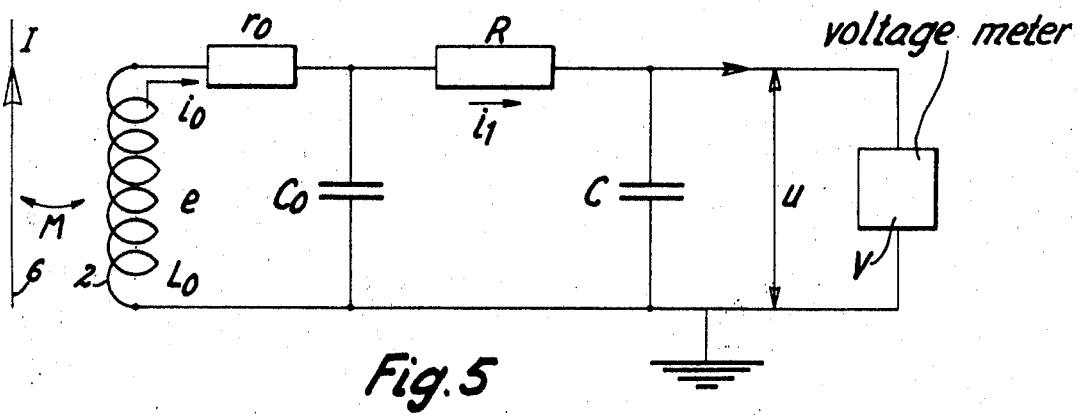
Fig. 5

3,434,052
DEFORMABLE LOOP APPARATUS FOR MEASURING ALTERNATING CURRENTS
Louis Joseph Féchant, Le Vesinet, France, assignor to La Telemecanique Electrique, Nanterre, Hauts-de-Seine, France, a limited company
Filed Apr. 18, 1966, Ser. No. 543,178
Claims priority, application France, Apr. 23, 1965, 14,408
U.S. Cl. 324—127
Int. Cl. G01r 29/00; H01f 21/02
6 Claims

ABSTRACT OF THE DISCLOSURE

The present invention broadly relates to the measurement of alternating currents through the use of a Rogowsky loop. The instant invention more particularly discloses a Rogowsky loop which is built as a deformable coaxial cable and is adapted for measuring alternating currents of comparatively high frequencies.

---

The present invention relates to the measurement of alternating currents.

Ratio devices in the form of transformer or shunts are generally used, particularly in commercial metering, to extend the range of alternating current instruments, so that large currents can be measured with instruments of moderate size and capacity.

The ratio devices are not adapted for use at comparatively high frequencies, and have other well-known drawbacks.

It is an object of the present invention to provide an apparatus of simple design which is adapted for measuring large alternating currents which may have frequencies as high as several hundred kilohertz, without modifying the characteristics of the electric circuit through which the current to be measured flows.

It is another object of the invention to provide an apparatus for measuring currents which has a great versatility of use, as the measurement does not require any physical contact with the said electric circuit which may have any shape, size or environment.

The apparatus according to the invention makes use of a general method which has been disclosed by Rogowsky in "Archiv für Electrotechnik," May 1,912. The said method as applied to the measurement of the alternating currents which flows through a lead consists in picking up the voltage induced in a coil which forms an open or openable loop around the said lead, of integrating the said voltage for obtaining the current and of measuring said current with a conventional instrument.

The Rogowsky method further makes for the elimination of the effect of any extraneous flux which is not due to the current to be measured, by providing a return path under the form of a further coil which is wound back to the starting point of the main coil in an opposite direction.

An important drawback of the Rogowsky apparatus resides in that there is a comparatively large capacitance between the two coils, which causes a substantial error to be made in the measurement of alternating currents at comparatively high frequencies.

Furthermore, the Rogowsky loop, which is comparatively rigid and unfit for conveniently embracing leads of various shapes and sizes, is not in fact adapted for use in a commercial meter.

It is a further object of the invention to provide a commercial current meter including an improved type of Rogowsky loop which is flexible and ready to embrace any lead, said meter being particularly sturdy and simple in design.

According to an important feature of the present invention, the said open or openable loop is built as a flexible coaxial cable the outer conductor of which is formed by the said main coil, whereas the inner conductor forms the return path.

According to a further feature of the invention, the current meter further comprises an integrating resistor-capacitor circuit mounted in a shielding box and connected to the said loop, through a comparatively short coaxial cable, by means of a connector which secures the loop and the coaxial cable together and closes the loop through contact of the free ends thereof.

According to yet another feature of the invention, the said flexible loop is enclosed in a thermo-shrinking insulating and protective sheath.

These and other features and objects of the present invention will become more readily apparent from the following description.

In the accompanying drawings:

FIG. 1 is a diagram illustrating the principles of the invention;

Figure 3:
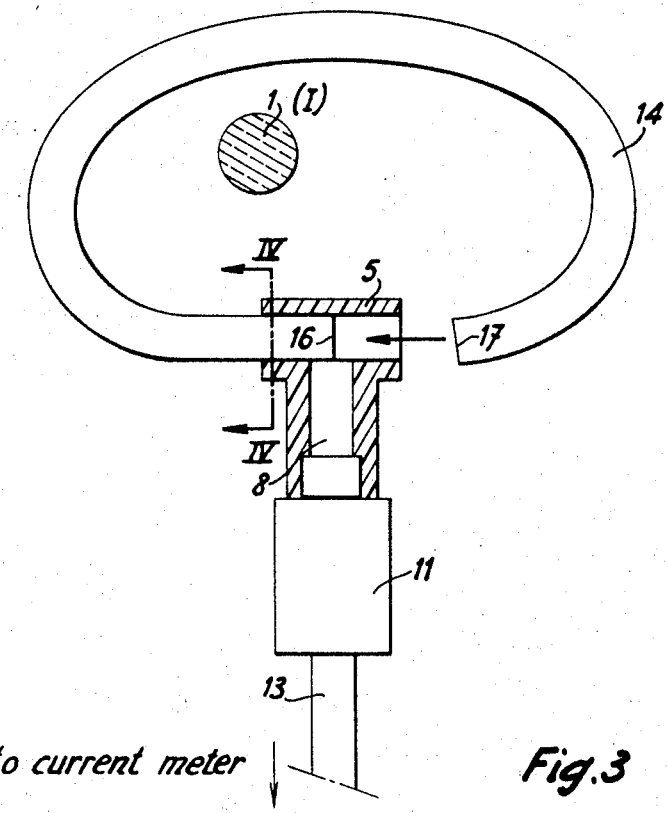

FIG. 3 diagrammatically illustrates a second embodiment of the said apparatus;

FIG. 4 is a cross-section, along IV—IV of FIG. 3; and

FIG. 5 is an electrical circuit equivalent to the apparatus.

The same reference numerals designate corresponding parts in the various figures.

The apparatus which is illustrated in the drawings essentially comprises an openable loop mounted as a flexible coaxial cable having an outer conductor 2 wound on a generally toroidal core 15 made of a non-magnetic material, and an inner conductor 3. The inner conductor is connected at one end of the coil 2 and returns back through the center of the coil 2. The coil 2 should have a constant cross-section and include a large number of closely wound turns, but its general contour-line will be modified for conveniently embracing the lead 1 through which flows a current I to be measured.

The turns should be evenly wound with a comparatively small constant pitch and the radius of the turns should be small with respect to the length of the loop.

Referring more particularly now to FIG. 1, assuming that I is the current expressed in amperes, $t$ the time in seconds, $s$ the cross-section of the coil in $m^2$, $n$ the number of turns per linear meter of the contour-line, and $\mu_0$ the permeability of the flux-path of the toroid, the voltage induced in the coil will be:

$$e = \frac{d\phi}{dt} = \mu_0 n s \frac{dI}{dt}$$

The flux $\phi$ is that which is generated by the tangential component $H_t$ of the magnetic field H produced by the current I at any point A of the contour-line. The effects of any extraneous flux $\phi_P$ which may exist across the loop (FIG. 1), respectively on the coil 2 and on the return conductor 3, will mutually compensate one another.

The apparatus further includes an integrating circuit comprised of a resistor R, and a capacitor C, and a voltage measuring instrument, V (FIG. 5), for instance an oscillograph or an electronic voltmeter, connected across the said capacitor.

The operation of the apparatus will be more clearly understood with reference to the circuit diagram of FIG. 5, in which the distributed self-inductance $L_0$, resistance $r_0$ and capacitance $C_0$ of the coil and connecting circuit have been illustrated as localized impedance elements.

M designates the mutual inductance between the lead 1 and the coil 2.

As the integrator gives the integral of the voltage $e$, which is proportional to $dI/dt$, the output voltage U which is measured by meter V finally is substantially proportional to I. One may write the Equation 1:

$$\frac{I}{V} = \frac{RC}{\mu_0 n s} = k$$

In fact, it may easily be shown that Equation 1 is not fully verified at high frequencies, as the effect of capacitance $C_0$ and self-inductance $L_0$ increases with the frequency of alternating current I. However, provided that the impedance elements of the circuit be suitably selected as a function of frequency, and that the material of the cores of the coaxial cables be selected with a low dielectric constant, the error will be as small as desirable for actual practice. These practical conditions of impedance selection will be easily determined by those skilled in the art, and non-limiting values are given hereinafter, as an illustrative example.

Figure 2:
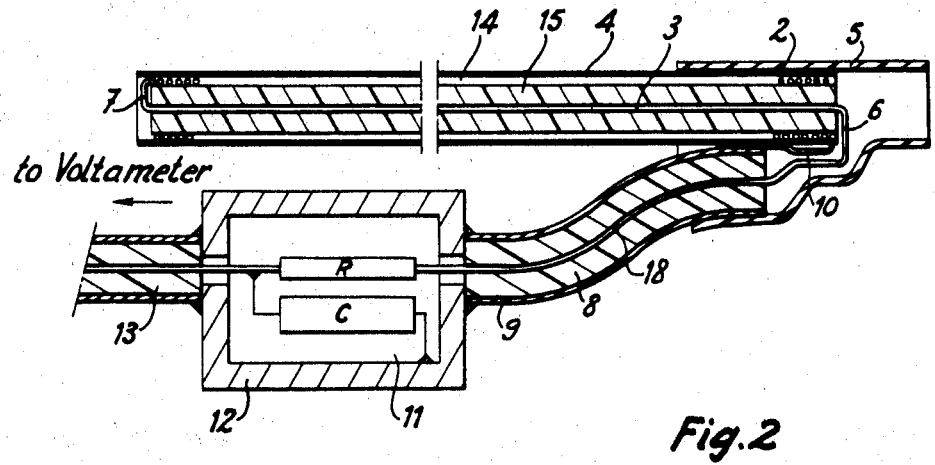
FIG. 2 is a longitudinal section of an apparatus according to a first embodiment of the invention.

Referring more particularly now to FIG. 2, a first practical embodiment of the apparatus will be disclosed in more detail.

In this embodiment, the integrator circuit 11, enclosed in a metal housing 12 which shields it against the high fields generated by current I, and the loops (2–3) have their axes of symmetry in a common plane through which the longitudinal section which is illustrated in FIG. 2 has been made.

The toroidal core 15 on which the one-layer coil 2 is closely wound has a constant circular cross-section and is for instance made of nylon, polyethylene, or other plastic material which enables to provide the loop with sufficient flexibility, while having a low dielectric constant. The loop will be readily deformed for conveniently embracing the conductor 1, as diagrammatically shown in FIG. 1, and will keep its deformation until reshaped— if necessary—by the operator for embracing another conductor.

In spite of the deformation of the loop, the return lead 3 should remain perfectly centered with respect to coil 2. A flexible thermo-shrinking plastic sheath 4 protects the coil against damage due to handling, helps in maintaining it on the core, and provides electrical insulation thereof with respect to the conductor 1. Such a sheath, which is commercially available, is slipped on the coil after the latter has been wound on the core and then shrinked through a suitable thermal treatment, for closely fitting to the coil.

The coil 2 and axial conductor 3 are connected together as shown in FIG. 2 and as more clearly apparent from FIG. 1 and, to the integrator circuit, by means of a shielded coaxial cable 8. The cable 8 should be as short as possible, in view of avoiding to decrease the resonant frequency $f_0$ of the whole apparatus.

It can be shown, in effect, that the said resonant frequency $f_0$ should be higher than a predetermined value $$\frac{10f}{\sqrt{\epsilon}}$$

$f$ being the frequency of the alternating current to be measured, and $\epsilon$ the maximal relative error which will be made on the measurement.

The inner axial conductors 7 and 18 are connected together in 6, whereas the coil 2 is connected in 10 to the outer conductor or shield 9 of coaxial cable 8.

A connector 5, advantageously made of thermo-shrinking plastic material, firmly secures the loop and the shielded coaxial cables together, whereas its right end (FIG. 2) forms a cylindrical sleeve wherein the free end of the loop closely fits and will be introduced and maintained by friction or by any equivalent means: the end surfaces of the winding will then be in contact together, so as to avoid any discontinuity in the winding, when the device is in operation. However, the loop will be easily opened, in view of positioning it around the conductor through which flows the current to be measured.

The integrator 11 is connected to the voltage meter (not shown in FIG. 2) through a further shielded coaxial cable 13. The outer conductors of cables 13 and 8 are soldered to the box 12 as shown. Resistor R connects the inner conductors of the said cables, whereas capacitor C connects box 12 to the junction point of resistor R and the inner conductor of cable 13.

As an illustrating example, the elements of the circuit which is allustrated in FIG. 2 may have the following values:

| | | |
|---|---|---|
| Mean diameter of the coil | mm | 3.5 |
| Diameter of the coil wire | mm | 0.1 |
| Number of turns of the coil per linear meter | | 8,500 |
| Length of the coil (contour-line) | cm | 18 |
| Capacitance per linear meter of the coaxial cable | f | $30.10^{-12}$ |
| Length of cable 8 | cm | 7 |

It results from the above Equation 1 that:

For RC=0.5 s., $k$=5000 a./mv.
For RC=500 $\mu$s., $k$=5 a./mv.

| | | |
|---|---|---|
| Capacitance $C_0$ of the equivalent circuit (FIG. 5) | f | $5.75.10^{-12}$ |
| Reactance $L_0\mu$ (to a frequency of 50 Hz.) | ohms | $51.10^{-3}$ |
| Resonant frequency $f_0$ (as defined hereinabove) | mHz | 5.2 |
| Resistance $\mu_0$ (FIG. 5) | ohms | 36 |

It can be shown that, for obtaining a measurement relative error of less than 1%, as regards both amplitude and phase of the measured current, one should take:

RC=50 $ms$ for $f$ between 500 Hz. and 5000 Hz. (This can be obtained by taking, for instance, R=100,000 ohms and C=0.5 $\mu$f.)

RC=5 $ms$ for $f$ between 5,000 and 50,000 Hz. (For instance, R=100,000 ohms C=50 $\mu$f.)

When $f$ exceeds 50,000 Hz. and until it reaches values as high as several hundreds of kilohertz, one may take RC=500$\mu$s.

In the embodiment of the apparatus which is shown in FIGS. 3 and 4, the shielded coaxial cables 8–13 and the integrator 11 have their axis of symmetry substantially perpendicular to contour-line of the loop at the ends 16–17 thereof, whereas the connector 5, which is shown, in FIG. 3, in section through a first plane which contains the axial conductor of the loop and, in FIG. 4, in section through a second plane IV—IV perpendicular to the first plane, is comprised of two mutually perpendicular sleeves. One of said sleeves is adapted closely to maintain the ends 16–17 of the loop, whereas the other sleeve lodges the coaxial cable 8 and secures it to the loop. The electrical connections, not shown, are made in the same manner as in the embodiment of FIG. 2.

In the embodiment of FIGS. 3 and 4, the connector 5 will indifferently be made of a flexible or rigid insulating material. (Whereas in the embodiment of FIG. 2 it will be flexible.) Moreover, due to the arrangement of FIG. 2, the coaxial cable 8 may be shorter, while properly separating the integrator from the loop.

What I claim is:

1. An apparatus for measuring an alternating current flowing through a conductor, said apparatus comprising: a readily deformable and openable loop adapted to embrace said conductor, said loop including an insulating non-magnetic flexible substantially toroidal core of constant circular cross-section, an outer flexible coil wound on said core and having first and second ends, a flexible inner conductor axially embedded within said core, said inner conductor being accurately centered with respect to said outer coil and having a first end connected at the first end of said coil and a second end; a resistor-capacitor integrating circuit having an input and an output; first means connecting the second ends of said coil and of said inner conductor to the input of said integrating circuit, and further means adapted for connecting a voltage meter at the output of said integrating circuit.

2. An apparatus as claimed in claim 1, wherein said loop includes a thermo-shrinking insulating sheath closely fitting over said coil.

3. An apparatus for measuring an alternating current flowing through a conductor, said apparatus comprising: a readily deformable and openable loop, adapted to embrace said conductor, said loop including an insulating non-magnetic flexible substantially toroidal core of constant circular cross-section, an outer flexible coil wound on said core and having first and second ends, a flexible inner conductor axially arranged within said core, said inner conductor being accurately centered with respect to said outer coil and having a first end connected at the first end of said coil and a second end; a resistor-capacitor integrating circuit having an input and an output; first means connecting the second ends of said coil and of said inner conductor to the input of said integrating circuit, and further means adapted for connecting a voltage meter at the output of said integrating circuit, said integrating circuit including a conductive shielding housing provided with an aperture and a resistor and a capacitor arranged in parallel within said housing, said first connecting means including a coaxial cable having an inner conductor which connects the second end of said flexible inner conductor of the loop to said resistor through said aperture, and an outer conductor which connects the second end of said coil to said housing.

4. An apparatus as claimed in claim 3, wherein said first connecting means further comprise an insulating sheath having first and second integral portions, said first portion securing together that end portion of said coaxial cable which is remote from said integrating circuit and that end portion of said loop which includes the second ends of said coil and flexible inner conductor, whereas said second portion is shaped as a sleeve adapted for receiving, closely fitting therein, the other end portion of the loop.

5. An apparatus as claimed in claim 3, wherein said first connecting means further comprise an insulating sheath having first and second integral mutually perpendicular sleeve portions, the first sleeve portion being adapted for receiving, closely fitting therein, the respective end portions of the loop, whereas the said coaxial cable is arranged within the second sleeve portion.

6. An apparatus as claimed in claim 3, wherein said housing includes a further aperture and said further connecting means include a coaxial cable having an outer conductor connected to the said housing and an inner conductor which passes through said further aperture and is connected to said resistor at a junction point, said capacitor connecting the said housing to said junction point.

References Cited

UNITED STATES PATENTS 2,238,298   4/1941   Wehrlin _____ 324—127 X
2,349,154   5/1944   Finch et al. _____ 343—870 X

FOREIGN PATENTS 752,013   7/1956   Great Britain.
987,310   3/1965   Great Britain.

RUDOLPH V. ROLINEC, *Primary Examiner.*

A. E. SMITH, *Assistant Examiner.*

U.S. Cl. X.R.

336—20